United States Patent Office 2,856,397
Patented Oct. 14, 1958

2,856,397

PRODUCTION OF METAL-CONTAINING AZO DYESTUFFS

Helmut Pfitzner and Otto Kaufmann, Ludwigshafen (Rhine), Germany, assignors to Badische Anilin & Soda-Fabrik Aktiengesellschaft, Ludwigshafen (Rhine), Rhineland-Pfalz, Germany No Drawing. Application October 7, 1953
Serial No. 384,764

Claims priority, application Germany October 9, 1952

8 Claims. (Cl. 260—151)

This invention relates to an improved process for the production of metal-containing azo dyestuffs. It relates especially to improvements of the metallization of o.o'-dihydroxyazo dyestuffs containing sulfonic acid groups in para-position to one hydroxy group whereby said sulfonic acid groups are split off.

It is already known that complex metal compounds of o.o'-dihydroxyazo, o-alkoxy-o'-hydroxyazo or o-carboxy-o'-hydroxyazo dyestuffs, containing several sulfonic acid groups loosen the sulfonic acid group standing in a para-position to a hydroxy group by heating the metal-containing dyestuffs with mineral acids or strong organic acids or agents yielding these acids in aqueous medium. If metal-free dyestuffs of said kind are metallized, the sulfonic acid groups standing in the para-position to a hydroxy or alkoxy group can be split off in the same operation.

This process is, however, inoperative or yields only very bad yields in the case of dyestuffs which do not contain any other sulfonic acid groups apart from those in para-position to the hydroxy or alkoxy groups.

We have now found that metal-containing azo dyestuffs containing no sulfonic acid group in the para-position to the hydroxy groups are obtained by treating o.o'-dihydroxyazo, o-alkoxy-o'-hydroxyazo or o-carboxy-o'-hydroxyazo dyestuffs which contain a sulfonic acid group in the para-position to a hydroxy or alkoxy group, and which may also contain further sulfonic acid groups in addition, with complex forming metal salts in the presence of polyhydric alcohols at raised temperature, as for example at 100° to 150° C.

Suitable polyhydric alcohols are for example glycol, butanetriol, penta-erythrite, glycerine, bis-hydroxyethyl ethers or ethers of the general formula $$HO(CH_2CH_2O)_n—CH_2—CH_2—OH$$

in which $n$ is an integer from 1 to about 25.

Metallization or dealkylating metallization and the splitting off of the sulfonic acid groups in para-position to the hydroxy or alkoxy groups proceed in one operation.

The splitting off of the said para-position sulfonic acid groups proceeds with better yields according to the new process than according to the known processes also in the case of dyestuffs which also contain further sulfonic acid groups.

By using as the initial dyestuff, e. g., an azo dyestuff of the general Formula I, there is obtained by the present process a metal complex compound of the dyestuff of the Formula II:

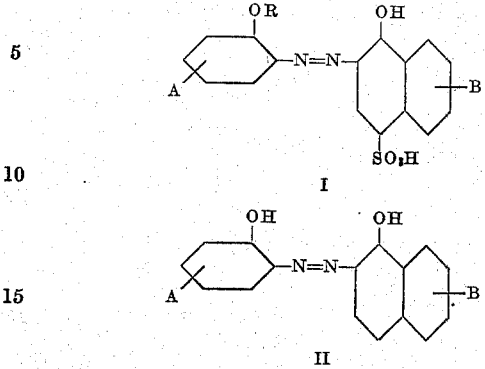

wherein R represents hydrogen or methyl, A represents a hydrogen or a halogen atom or a nitro, methoxy or sulfamido group, and B represents a hydrogen atom or a sulfamido or a sulfonic acid group.

As initial dyestuffs, all o.o'-dihydroxyazo, o-alkoxy-o'-hydroxyazo and o-carboxy-o'-hydroxyazo dyestuffs come into question which bear sulfonic acid groups in para-position to the hydroxy or alkoxy groups in o-position to the azo group. It is essential for a smooth course of the splitting-off reaction to employ polyhydric alcohols of the said kind, because in other organic solvents the splitting off proceeds only incompletely or with more or less extensive decomposition of the dyestuff. Sulfonic acid amide groups in any position remain unchanged and are not split off.

A further advantage of the new process consists in the fact that it is possible to work without the addition of mineral acids or strong organic acids, i. e. in a weakly-acid medium, so that the possibility of the dyestuff being decomposed is substantially excluded and corrosion of the reaction vessel is also strongly reduced.

The special significance of the new process resides in the fact that by means thereof it is possible to prepare in good yields complex metal compounds of dyestuffs derived from 1-hydroxynaphthalene or its derivatives as coupling components, as for example complex metal compounds of the dyestuffs 5-nitro-2-aminophenol→1-hydroxynaphthalene or 5 nitro-2-aminophenol→1-hydroxynaphthalene-8-sulfamide, because such metal-containing dyestuffs are accessible only with difficulty or not at all by other methods.

The metal-containing dyestuffs thus obtainable can be used for colouring organic solutions or plastic masses, such as lacquer varnish, varnishes, articles of cellulose esters and ethers or other synthetic materials. They can also be used for dyeing wool, silk, leather, casein wool or synthetic fibres, such as polyamide and polyurethane fibres, from aqueous solution or dispersion. Those which are not soluble in organic solvents and water are suitable also as pigment dyestuffs. Finally, the metal-containing dyestuffs, in so far as they contain one atom of chromium to one dyestuff molecule, can be reacted with colourless complex-forming compounds to form new complex dyestuffs.

The following examples will further illustrate this invention but the invention is not restricted to these examples. The parts are by weight.

Example 1

21 parts of the azo dyestuff from diazotized 1-amino-2-hydroxy-4-nitrobenzene and 1-hydroxynaphthalene-4-sulfonic acid are introduced while stirring at 130° C. into a solution of 16 parts of crystallized cobalt chloride ($CoCl_2.6H_2O$) in 100 parts of glycol and the mixture is then stirred further for 3 hours at 130° to 135° C. The dyestuff thereby goes partly into solution. After cooling, 600 parts of water and 60 parts of sodium chloride are added to the reaction mixture, the whole of the dyestuff thus separating out after stirring for a longer time. It is filtered off by suction, washed with water and dried. The complex cobalt compound of the dyestuff of the formula

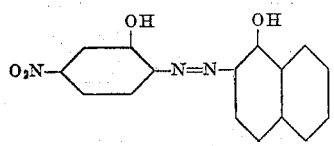

obtained is free from sulfonic acid groups and dyes wool or polyamide fibres reddish-blue shades of very good fastness properties from a neutral bath.

If 1-amino-2-hydroxy-5-chlorobenzene is taken as the diazo component instead of 1-amino-2-hydroxy-4-nitrobenzene there is obtained under the same conditions a dyestuff which dyes polyamide fibres violet shades.

Example 2

25 parts of the azo dyestuff from diazotized 1-amino-2-methoxy-4-nitrobenzene and 1-hydroxy-8-sulfamido-naphthalene-4-sulfonic acid are introduced while stirring at 130° C. into a mixture of 100 parts of beta.beta'-dihydroxyethyl ether and a solution of 4 parts of chromium oxide ($Cr_2O_3$) in 12 parts of water and 6 parts of concentrated sulfuric acid and the mixture is further stirred for 3 hours at 135° to 140° C. The dyestuff thereby goes completely into solution. It is separated by the addition of 1000 parts of water and 30 parts of crystallized sodium acetate, then filtered off by suction, washed out with water and dried at 80° C. The chromium containing dyestuff obtained contains no sulfonic acid groups, whereas the sulfonamide group is unchanged. The dyestuff obtained is a chromium complex compound of the azo dyestuff of the formula

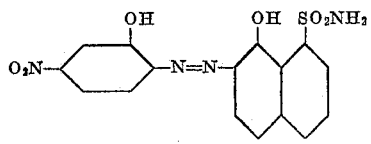

It dyes wool blue shades of good fastness properties from a weakly acid bath.

Example 3

20 parts of an aqueous solution of a basic chromium chloride solution, which has been obtained by dissolving 15.2 parts of chromium oxide ($Cr_2O_3$) in 20 parts of water and 40 parts of a hydrochloric acid having the specific gravity 1.16, are added to 150 parts of glycol. Into this mixture, while stirring at 130° C., there are then introduced 24 parts of the azo dyestuff from diazotized 1-amino-2-hydroxy-5-sulfamido-benzene and 1-hydroxynaphthalene-4-sulfonic acid, the whole then being further stirred at 135° C. for 3 hours. The separation and working up of the complex chromium dyestuff formed are carried out as described in Example 2. The dyestuff is a chromium complex compound of the azo dyestuff of the formula

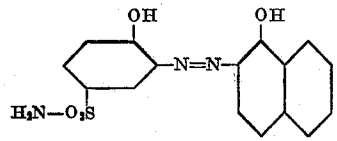

It contains no sulfonic acid groups, whereas the sulfonamide group is unchanged; it dyes wool or polyamide fibres violet shades of good fastness from a weakly acid bath.

Example 4

16 parts of the azo dyestuff from diazotized 1-amino-2-hydroxybenzene-5-sulfonic acid and 2-hydroxynaphthalene are introduced in small portions into a solution, heated to 130° C., of 14 parts of crystallized chromium chloride ($CrCl_3.6H_2O$) in 150 parts of glycerine while stirring, and the mixture is then further stirred for 4 hours at 135° to 140° C. The dyestuff thereby goes completely into solution. After the usual working up there is obtained a dyestuff free from sulfonic acid groups which is identical with the dyestuff obtainable by demethylating chroming of the azo dyestuff from diazotized 1-amino-2-methoxybenzene and 2-hydroxynaphthalene, and which dyes lacquer varnish Bordeaux-red shades. It is a chromium complex compound of the azo dyestuff of the formula

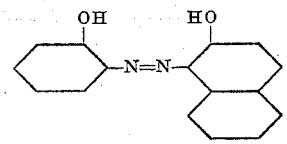

Example 5

19 parts of the azo dyestuff from diazotized 1-aminobenzoic acid and 1-hydroxynaphthalene-4-sulfonic acid are introduced in small portions while stirring into a solution, heated to 130° C., of 14 parts of crystallized chromium chloride ($CrCl_3.6H_2O$) in 150 parts of glycol and the mixture is then further stirred for 3 hours at 135° to 140° C. The dyestuff thereby goes completely into solution. After working up as described in Example 2, a dyestuff is obtained which is free from sulfonic acid groups and can be used as a violet pigment dyestuff. It is a chromium complex compound of the azo dyestuff of the formula

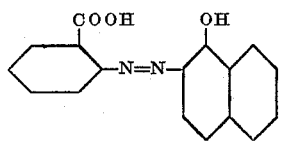

Example 6

25 parts of the azo dyestuff from diazotized 1-amino-2-methoxy-4-nitrobenzene and 1-hydroxynaphthalene-4.8-disulfonic acid are introduced at 100° C. while stirring into a mixture of 9 parts of crystallized copper chloride ($CuCl_2.2H_2O$) and 150 parts of glycol and the mixture is further stirred for 1 hour at 120° C. After the working up described in Example 1 a copper-containing dyestuff is obtained which contains no sulfonic group in the 4-position of the naphthalene ring but contains still the sulfonic acid group in the 8-position. It is a copper complex compound of the azo dyestuff of the formula

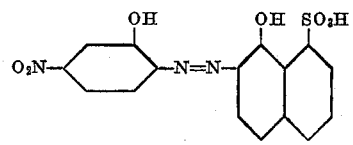

By heating for half an hour with 500 parts of 6% hydrochloric acid at 90° C., the dyestuff can be freed from copper and a dyestuff is then obtained which dyes wool as an afterchroming dyestuff in blue shades with good fastness.

If 13 parts of $AlCl_3.6H_2O$ are used in paragraph 1 of this example instead of 9 parts of crystallized copper chloride, the same afterchroming dyestuff is obtained after demetallization.

Example 7

24 parts of the azo dyestuff from diazotized 1-amino-2.5-dimethoxy-4-sulfamidobenzene and 1-hydroxynaphthalene-4-sulfonic acid are introduced in small portions into a solution, heated to 130° C., of 14 parts of crystallized chromium chloride ($CrCl_3.6H_2O$) in 150 parts of glycol and the whole is further stirred for 3 hours at 134° to 140° C. After cooling, 1000 parts of water and 20 parts of crystallized sodium acetate are added to the reaction mixture and stirred for some hours, whereby the complex chromium containing dyestuff separates. It is filtered off by suction, washed with water and dried. It contains no sulfonic acid group and dyes wool blue shades of good fastness properties from a weakly acid bath. It is a chromium complex compound of the azo dyestuff of the formula

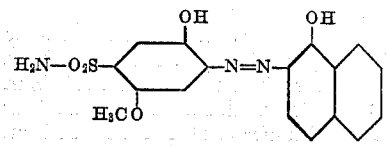

Example 8

21 parts of the azo dyestuff from diazotized 1-hydroxy-2-aminonaphthalene-4.8-disulphonic acid and 1-phenyl-3-methyl-5-pyrazolone are introduced in small portions while stirring into a solution, heated to 130 C., of 14 parts of crystallized chromium chloride ($CrCl_3.6H_2O$) in 150 parts of glycol and the mixture is then stirred for 3 hours at 135° to 140° C. The dyestuff thereby goes completely into solution. After working up as described in Example 2, a chromium-containing dyestuff is obtained which contains only one sulfonic acid group and dyes wool or polyamide fibres fast Bordeaux shades. It is a chromium complex compound of the azo dyestuff of the formula

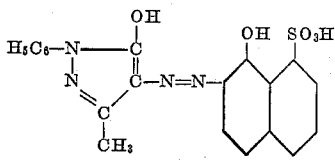

Example 9

17 parts of the azo dyestuff from diazotized 1-amino-2-methoxybenzene-5-sulfonic acid and 1-hydroxy-4-methylbenzene are introduced in small portions at 120° C. while stirring into a mixture of 14 parts of crystallized chromium chloride ($CrCl_3.6H_2O$) in 150 parts of glycol and the mixture is then stirred for 4 hours at 135° C. The dyestuff thereby goes completely into solution. After working up in the way described in Example 2, a brown-red dyestuff is obtained which is free from sulfonic acid groups and can be used as a pigment dyestuff. It is a chromium complex compound of the azo dyestuff of the formula

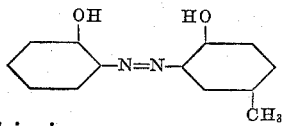

What we claim is:

1. In a process for the production of a metal complex compound of a monoazo dyestuff by reaction of a metal-free monoazo dyestuff of the group consisting of o.o'-dihydroxy, o-methoxy-o'-hydroxy and o-carboxy-o'-hydroxy monoazo compounds containing a sulfonic acid group in para-position to a hydroxy group with a complex forming metal salt wherein the metal is bound in complex combination with said monoazo dyestuff while splitting off said sulfonic acid group in para-position to hydroxy group, the improvement which comprises: heating said metal-free monoazo dyestuff together with said complex forming metal salt in a reaction media consisting essentially of a polyhydric alcohol at about 100° C. to 150° C., said polyhydric alcohol acting to split off a sulfonic acid group in para-position to a hydroxy group.

2. An improved process as defined in claim 1 wherein said complex forming metal salt is a salt of a metal selected from the group consisting of cobalt, chromium, copper and aluminum.

3. An improved process as claimed in claim 1 wherein the polyhydric alcohol is selected from the group consisting of glycol, butanetriol, penta-erythrite, glycerine, bis-hydroxyethyl ether, and ethers of the general formula $HO(CH_2CH_2O)_n$—$CH_2CH_2OH$ in which $n$ is an integer from 1 to 25.

4. An improved process for the production of a metal-containing monoazo dyestuff in which the metal is in complex combination with a monoazo compound of the general formula

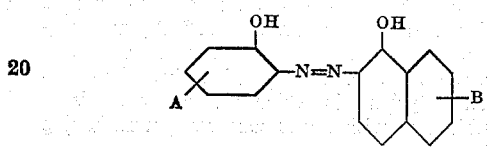

wherein A represents a substituent selected from the group consisting of hydrogen, chlorine, nitro, methoxy and sulfamido groups and B represents a substituent selected from the group consisting of hydrogen, sulfamido and sulfonic acid groups, which process comprises: heating a monoazo dyestuff of the general formula

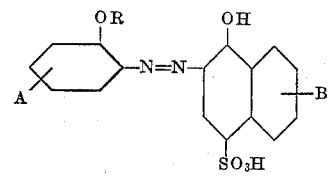

wherein R represents a member of the group consisting of hydrogen and methyl and A and B have the same significance as above, together with a complex forming salt of a metal selected from the group consisting of cobalt, chromium, copper and aluminum in a reaction media consisting essentially of a polyhydric alcohol at about 100° C. to 150° C., said polyhydric alcohol acting to split off a sulfonic acid group in para-position to a hydroxy group.

5. A process for the production of a cobalt-containing monoazo dyestuff in which the cobalt is in complex combination with a monoazo compound having the formula

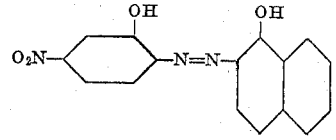

said process comprising: introducing at about 130° C. the monoazo dyestuff from diazotized 1-amino-2-hydroxy-4-nitrobenzene and 1-hydroxynaphthalene-4-sulfonic acid into a reaction media consisting essentially of a polyhydric alcohol and containing cobalt chloride, and heating for several hours at about 135° C., said polyhydric alcohol acting to split off said 4-sulfonic acid group.

6. A process for the production of a chromium-containing monoazo dyestuff in which the chromium is in complex combination with a monoazo compound having the formula

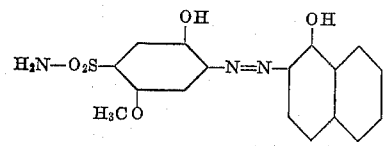

said process comprising: introducing at about 130° C. the monoazo dyestuff from diazotized 1-amino-2.5-dimethoxy-4-sulfamido-benzene and 1-hydroxynaphthalene-4-sulfonic acid into a reaction media consisting essentially of a polyhydric alcohol and containing a chromic salt, and heating for several hours at about 140° C., said polyhydric alcohol acting to split off said 4-sulfonic acid group.

7. A process for the production of a chromium-containing monoazo dyestuff in which the chromium is in complex combination with a monoazo compound having the formula

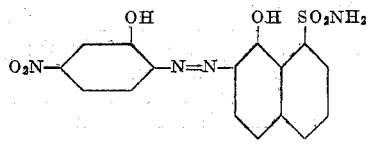

said process comprising: introducing at about 130° C. the monoazo dyestuff from diazotized 1-amino-2-methoxy-4-nitrobenzene and 1-hydroxynaphthalene-8-sulfamido-4-sulfonic acid into a reaction media consisting essentially of a polyhydric alcohol and containing a chromic salt, and heating for several hours at about 135° C., said polyhydric alcohol acting to split off said 4-sulfonic acid group.

8. A process for the production of a chromium-containing monoazo dyestuff in which the chromium is in complex combination with a monoazo compound having the formula

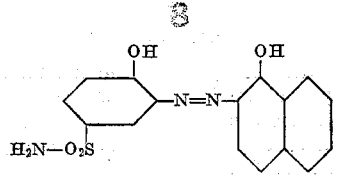

said process comprising: introducing at about 130° C. the monoazo dyestuff from diazotized 1-amino-2-hydroxy-5-sulfamido-benzene and 1-hydroxynaphthalene-4-sulfonic acid into a reaction media consisting essentially of a polyhydric alcohol and containing a chromic salt, and heating for several hours at about 135° C., said polyhydric alcohol acting to split off said 4-sulfonic acid group.

References Cited in the file of this patent

UNITED STATES PATENTS

| | | |
|---|---|---|
| 1,590,482 | Straub et al. | June 29, 1926 |
| 1,693,448 | Krzikalla et al. | Nov. 27, 1928 |
| 1,994,116 | Straub et al. | Mar. 12, 1935 |
| 2,111,270 | Moll et al. | Mar. 15, 1938 |
| 2,673,199 | Widmer et al. | Mar. 23, 1954 |
| 2,674,515 | Widmer et al. | Apr. 6, 1954 |